United States Patent [19]

Spescha

[11] Patent Number: 5,518,924
[45] Date of Patent: May 21, 1996

[54] PROCESS AND INSTALLATION FOR MANUFACTURING A PASTEURIZED SUBSTRATE

[75] Inventor: Adelrich Spescha, Tobel, Switzerland

[73] Assignee: Adymat AG, Freidorf, Switzerland

[21] Appl. No.: 276,648

[22] Filed: Jul. 19, 1994

Related U.S. Application Data

[63] Continuation of Ser. No. 761,927, filed as PCT/CH90/00265, Nov. 21, 1990, abandoned.

[30] Foreign Application Priority Data

Nov. 22, 1989 [CH] Switzerland ............................ 4186/89

[51] Int. Cl.$^6$ .......................... C12S 13/00; C12M 1/16; B09B 3/00
[52] U.S. Cl. .................. 435/290.2; 435/262; 435/289.1; 422/164; 422/232
[58] Field of Search ...................... 435/262, 287, 435/299, 818; 422/164, 184, 232, 283

[56] References Cited

U.S. PATENT DOCUMENTS 3,129,828  4/1964  Lusk ......................................... 422/184
3,837,810  9/1974  Richards et al. ................................ 71/9

FOREIGN PATENT DOCUMENTS 2326970  6/1977  France .

OTHER PUBLICATIONS

*Ninth New Collegiate Dictionary*, Merriam–Webster, Inc. p. 853, 1990.

Primary Examiner—Donald E. Czaja
Assistant Examiner—T. J. Reardon
Attorney, Agent, or Firm—Jacobson, Price, Holman & Stern

[57] ABSTRACT

A process for manufacturing a pasteurized substrate by biological decomposition of organic refuse is characterized by the following processing steps:

a) A container (1) is half filled with a mixture of solid refuse to be decomposed, liquid substances are added, and the mixture is stirred for a first residence time of 2 to 3 hours.

b) A quantity not greater than one-third of the weight of the mixed refuse of decanted clarified sludge at a temperature equal to that of the mixed refuse is added. A quantity of white lime may also be added, and stirring is continued for a further residence time of 69 to 70 hours. An apparatus for carrying out the process comprises a parallelepipedal container (1) with a pentagonal profile in the shape of an inverted house roof with its ridge pole sunk in the ground and whose width (b) is greater than its length (l). The base of the container includes two identical, obtuse-angled, mutually inclined half-bases (1.1, 1.2) the surface of which is shaped to match screw conveyors (2) mounted thereon.

12 Claims, 2 Drawing Sheets

PROCESS AND INSTALLATION FOR MANUFACTURING A PASTEURIZED SUBSTRATE

This application is a continuation of U.S. application Ser. No. 07/761,927 filed as PCT/CH90/00265, Nov. 21, 1990, now abandoned.

BACKGROUND OF THE INVENTION

The invention relates to a process for manufacturing pasteurized substrates.

In a known process of appropriate generic form, following preparation in the usual manner by processes of sifting, separation and size reduction, refuse is introduced into a circular fermentation container with a circular motion of distribution at the perimeter and, for the purpose of introducing and maintaining an aerobic and biological process of decomposition, the refuse is constantly agitated and gradually displaced towards the central exit aperture of the fermentation container. The refuse is agitated by a sequence of connected movements running in a screw-like motion in a predetermined circular direction. This process prevents the so-called "short circuit currents" in the refuse material, where parts of the refuse to be treated reach the exit aperture in a shorter time than the residence time required for complete biological decomposition or conversion respectively of the refuse material. Thus an attempt is made to avoid mixing the already fermented final product with refuse which has not yet decomposed.

From this suggestion concerning the process in question, no exact details can be gathered about the total length of time needed for the process. On the basis of appropriate reference to the corresponding publication, it is highly probable that the residence time of the waste to be treated in the fermentation container will be, perhaps, between 4 and 6 days. Further, this suggestion does not state whether there is a periodic process procedure in which a definite amount of refuse is put into the fermentation container each time and then fermented or whether it is a matter of a continuously supplied and running decomposition process.

Finally, the suggestion does not offer any advice as to the composition of the refuse to be processed: whether and to what extent agricultural waste, sewage sludge, liquid manure etc., can be processed using this method. Only urban refuse is mentioned as a raw material to be treated. Furthermore, the question of sterilizing the final product remains open.

In accordance with the statement, the process in question is simply an intensive aeration of the refuse material by continuous agitation of same, while it is transported from the inlet of the fermentation container to the outlet of same in an unspecified residence time.

There is a known composting device which has a swivel bridge which traverses the associated circular fermentation container along the diameter of same and which can move along the rails secured in circular fashion around the upper edge of the container by means of rollers attached to both ends of the swivel bridge. The swivel bridge can be driven with the aid of an electric drive via a step-down gear acting on one of the rollers. In this way it is also supported by a central bearing which is attached to the truncated cone shaped inner wall in the centre of the inside of the fermentation container. Further the swivel bridge consists of two bridge halves which each go from the central bearing radially to the perimeters of the container. One of the bridge halves bears a screw conveyer which is assigned to convey the waste material to be processed to the periphery of the fermentation container. This extends from a receiving funnel assigned to the central bearing to a delivery chute situated in the peripheral area. On the other half of the bridge, numerous motor-driven aerating screws are attached in two parallel rows, which run radially between the truncated cone shaped inner wall and the cylindrical outer wall of the fermentation container. The points of the aerating screws are set in a downwards direction from the bridge and are inclined diagonally so that each spiral tip points forwards in the direction of rotation of the bridge and at the same time in the direction of the outer wall of the container. In addition, the aerating screws in one row are displaced in a radial direction with regard to those in the other row. The screw surface of the aerating screws lifts the refuse material from the base of the container and, stirring continuously, transports it upwards.

The fermentation container can be filled between 80 and 85% of the height of the wall.

The rotation of the bridge is supported by the aerating screws which rotate in the same direction and intimately mix the refuse across the whole width of the fermentation container. The air necessary for the said process is supplied by means of a ventilator, via a number of openings near the base of the outer wall and via the distribution pipes connecting the openings with the ventilator.

The treated refuse material can be expected to displace itself in a continual and uniform movement from the outer wall to the exit in the inner wall as a result of the diagonal position of the aerating screws.

The peripheral speed of the individual aerating screws can be set to achieve a suitable decomposition of the refuse material. There are also measures to suspend the operating of the device in case an aerating screw comes into contact with an unexpected obstacle.

A number of power operated probes, which can be inserted into the fermentation container from below, help to achieve the prevailing conditions of, for example, temperature and oxygen content of the refuse being treated and to control the supply of air.

A major disadvantage of the equipment as described previously is its cost of construction. There is also the drawback of the considerable amount of energy required and the numerous opportunities for error.

SUMMARY OF THE INVENTION

The object of the present invention is the provision of a process as described which allows the biological conversion of organic refuse material into a pasteurized substrate within the shortest possible residence time, while avoiding the previously mentioned disadvantages of the known fermenting methods.

The process of the present invention facilitates a speedy, mechanized and controllable decomposition of all kinds of organic refuse material, including sewage sludge, animal carcasses, liquid manure, etc., with degermination, into a pasteurized substrate without the use of extraneous heat.

Further the invention has a facility for implementing the process according to the present invention with a receptacle for the refuse mixture to be treated, together with devices for supplying the refuse and for removing the already fermented product, as well as having screw conveyors for stirring the refuse mixture.

A further object of the invention is therefore to create a piece of equipment in accordance with the generic type in particular to carry out the present process. This is to facilitate the production of a pasteurized substrate which is satisfactory in both technological and economic terms while avoiding the aforementioned disadvantages.

The device according to this invention is significantly simpler than the devices known in the art. An increased operational reliability and a marked reduction in energy usage can therefore be anticipated.

The invention is explained in greater detail in the drawing, for example with a preferred way of constructing the device for substrate pasteurization.

BRIEF DESCRIPTION OF THE DRAWINGS

FIG. 2 is a top view of the device according to FIG. 1, wherein the upper part has been removed along line II—II and.

FIG. 3 is a sectional view taken along line X—X in FIG. 1.

DETAILED DESCRIPTION

The device includes a receptacle 1 for the refuse to be decomposed, two pairs of screw conveyors 2 fixed in the receptacle to stir and, at the same time, aerate the refuse mixture and two delivery spirals 5 assigned to each of the screw conveyors.

Figure 1:
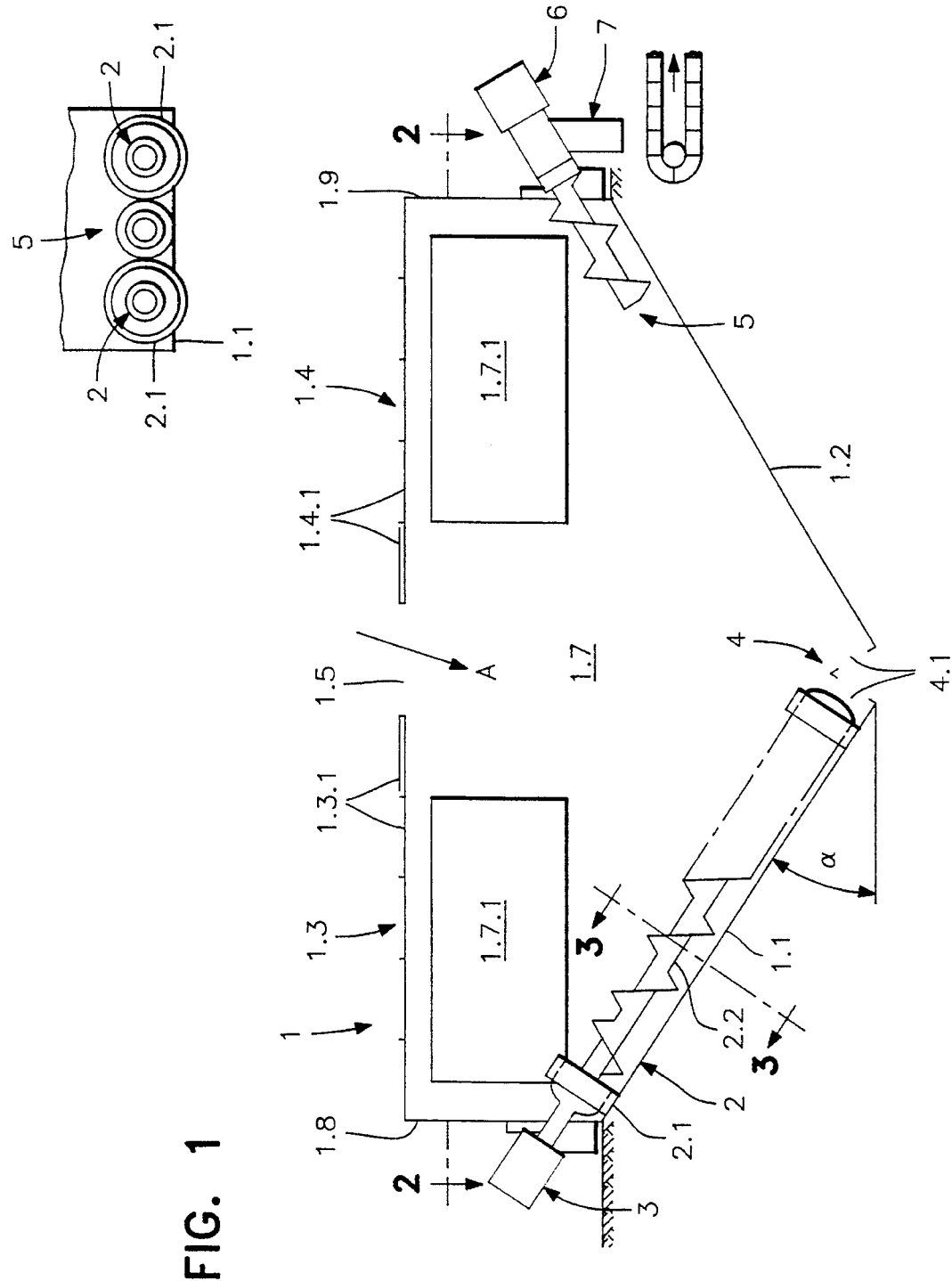
FIG. 1 is a sectional side view taken along line I—I of FIG. 2 and illustrating a device for producing sterilized substrates according to the present invention.
Figure 2:
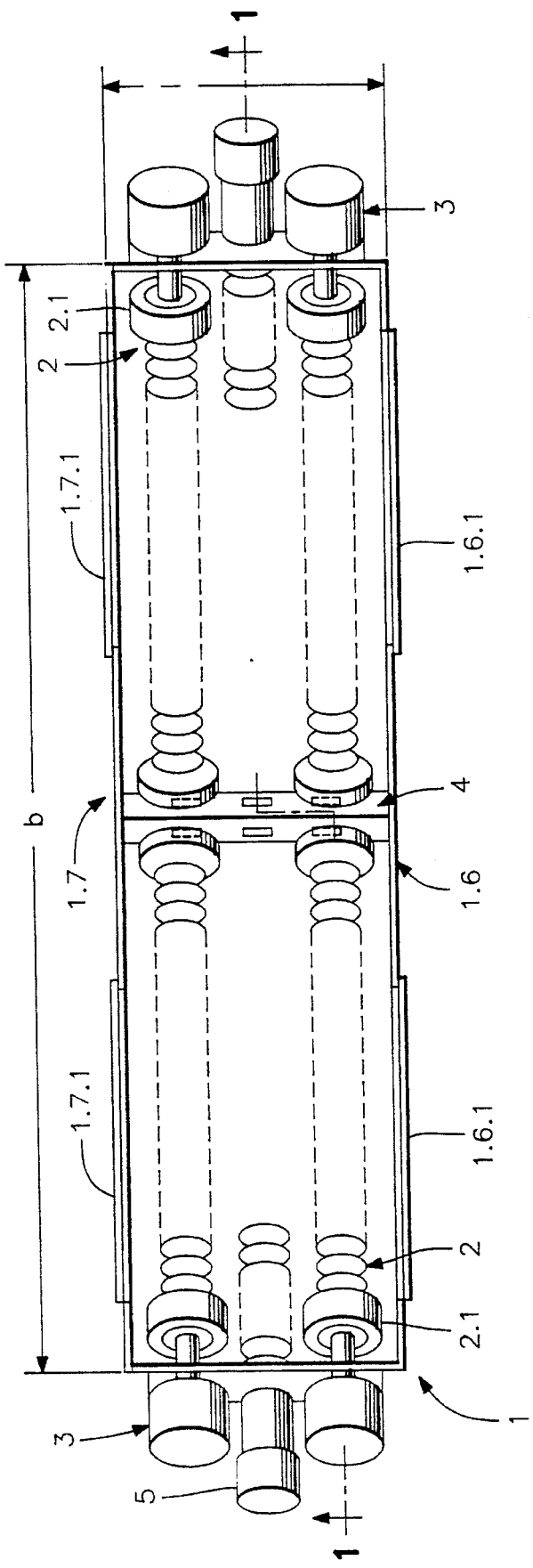

From above, the receptacle is a quadrilateral shape but when viewed from the front, it has a pentagonal shape resembling an inverted house whose roof is sunk into the ground. As can be seen particularly from FIG. 2, the receptacle has a large width b in comparison with its length l. The base of the container consists of two equal, obtuse-angled, mutually inclined base halves 1.1, 1.2 whose surfaces are shaped to match the screw conveyors 2 and 5. The four screw conveyors are arranged so that one pair is near one of the two sloping half-bases 1.1, 1.2 of the receptacle 1, running parallel to same. The angle of inclination of the half-bases 1.1, 1.2 to the horizontal is advantageously chosen to be 30 degrees. A quadrilateral container lid is designed to cover the receptacle 1 and takes the form of two identical lid halves 1.3, 1.4. Both lid halves 1.3, 1.4 are made of level, rectangular lid elements 1.3.1, 1.4.1 which are linked together by hinges. In this way, when the container lid is on, both of the inner neighbouring lid elements 1.3.1, 1.4.1 can be folded back to create an opening 1.5 in the lid for the refuse mixture A which is to be decomposed. The supply of refuse mixture A or the components of same to the opening 1.5 can take place in ways known in the art, for example by means of a conveyor belt.

It is advantageous to include at least one door 1.6.1, 1.7.1 in the pentagonal walls (i.e., in the front wall 1.6 and in the rear wall 1.7) to facilitate servicing and cleaning work inside the receptacle 1.

The bearing 2.1 of the screw conveyors 2 on each of the assigned half-bases 1.1, 1.2 of the receptacle is positioned at both ends of the screw. A reversing electric drive 3, connected to the upper screw end, is arranged on the narrow side 1.8 or 1.9 of the outside surface of the receptacle 1, through which the relevant screw end is carried.

A length of 4.5 meters proved to be a particularly suitable length for the screw conveyors 2. A diameter of 60 to 80 mm is suitable for the shaft-shaped screw core 2.2, which is preferably hollow. The screw conveyors 2 are appropriately shaped to improve the mixture of treated refuse with the freely circulating air, i.e., they are shaped in such a way that the conveying direction of the first 85% of the overall length goes from the bottom of the screw to the top, and in the reverse direction on the remaining 15% of the length. Between the lower ends of both pairs of screw conveyors 2 in the corner formed by the two inclined half-bases 1.1, 1.2 of the receptacle 1 there is a partition 4 with a triangular profile. The height of the partition should be less than the diameter of the screw projected onto it. In addition, there are a number of entrance ports 4.1 in the partition 4, via which the air required for the bacterial aerobic conversion of the refuse is sucked into the receptacle 1 by the vacuum present inside the receptacle.

The extraction of the fermented substrate occurs at the meeting point of the two sections of each screw conveyor, advancing in opposite directions and having a mutual aspect ratio of 85%:15% of the screw length. Here there is a delivery screw 5 on each of the two inclined half-bases 1.1, 1.2 of the receptacle 1, symmetrically positioned between the two screw conveyors 2 assigned there. The upper end of each delivery screw 5 penetrates the respective narrow sides 1.8 or 1.9 of the receptacle 1 and is linked to an electric drive 6. Corresponding to the winding direction of the delivery screw 5 from the lower end of the screw upwards, an outlet 7 is positioned near the upper end of each one, facilitating the movement of the final product, for example by means of a conveyor belt. The length of the delivery screw 5 extends from the outlet 7 to the height at which the opposing actions of the screw conveyors 2 meet.

A control unit regulates the downwards stirring motion of the screw conveyors 2 with a number of revolutions n equal to 6 to 8 revolutions/minute with an initial cycle time $t_1$ equal to 10 minutes for the forward displacement of the refuse mixture, with a secondary clock time $t_2$ equal to 0.5 minutes for the rearward displacement of the mixture and with a period ts equal to 5 minutes for the standstill between the two motions. This control unit is not depicted in the drawing. The rearward motion of the screw conveyor is necessary to prevent the material from sticking to the inner surfaces of the receptacle 1. This avoids the creation of "dead" zones and the whole of the refuse mixture is continuously agitated throughout the composting process.

The invention facilitates the elimination of all kinds of refuse, such as urban or agricultural waste, sewage sludge, liquid manure, animal carcasses, etc., and makes it possible to use it in the form of pasteurized substrate with the aid of a controllable and biological rotting process which can be mechanically implemented with a total duration of 72 hours, wherein the temperature of over 80 degrees Celsius that occurs during the process sterilizes the final product without extraneous heat.

The so-called carcass soup which is added to the refuse mixture is a meat soup made from animal carcass with the fat content removed. This is necessary because the fat blocks the capillary routes in the refuse mixture and thereby restricts the supply of air for the rotting process.

If the rotting process has a tendency to come to a standstill, evidenced by a rapid cooling of the treated refuse mixture as a result of the presence of acidic refuse material, thus lowering the ph value, the process can be reactivated by the addition of small quantities of white lime or by mixing an additional quantity of wood chips and/or untreated grass and/or straw manure into the refuse mixture.

I claim:

1. An apparatus for producing pasteurized substrates by aerobic biological decomposition of organic waste, comprising:

a) a receptacle having a top, four sides, and a bottom, including:
      i) two opposing pentagular side walls forming a first two of the four sides of the receptacle, each having a top edge aligned with the top of the receptacle, two side edges of identical length extending normally from the top edge, and two bottom edges extending from the side edges and joining together away from the top edge at an apex;
      ii) two opposing rectangular side walls forming a second two of the four sides of the receptacle, each having: a top edge aligned with the top of the receptacle; two side edges extending from the top edge thereof and having lengths identical to the lengths of the side walls of the pentagular side walls, each side edge coextensively joining one side edge of each pentagular side wall; and a bottom edge connected to the side edges;
      iii) two base walls, each extending from the bottom edge of one of the rectangular side walls between opposing bottom edges of the pentagular side walls and joining to form the bottom of the receptacle;
      iv) a lid extending between the top edges of the pentagular side walls and the top edges of the rectangular side walls and including an opening;
      iv) a refuse inlet in the lid; and
      v) a pasteurized-material outlet in one of the rectangular side walls;
   b) at least one screw conveyor having a radial contour positioned inside the receptacle along one of the base walls correspondingly contoured to the radial contour of the screw conveyor;
   c) a bearing supporting the screw conveyor and positioned in the correspondingly contoured base wall; and
   d) a reversible drive mounted on the receptacle exterior and connected to the screw conveyor through a side wall.

2. The apparatus of claim 1 including at least two screw conveyors, one positioned along each base wall, and wherein the bottom of the receptacle forms a partition between the two screw conveyors, the partition including two inclined walls, each inclined wall extending from one of the base walls of the receptacle, the height of each inclined wall being less than the cross-sectional height of the corresponding screw conveyor.

3. The apparatus of claim 2 wherein at least one of the partition walls has at least one air inlet.

4. The apparatus of claim 1 wherein the two base walls of the receptacle are joined together such that a 30° angle is formed between each base wall and a plane normal to the side walls on which rests the bottom of the receptacle.

5. The apparatus of claim 4 wherein the lid is removable and comprises two rectangular lid halves hinged together, and wherein each of the two pentagonal side walls includes at least one door.

6. The apparatus of claim 4 including at least two screw conveyors positioned adjacent and parallel to each other.

7. The apparatus of claim 6 further comprising a delivery screw positioned symmetrically between the two screw conveyors and extending into the receptacle from the pasteurized-material outlet, and wherein the two parallel screw conveyors run in opposite directions to each other.

8. The apparatus of claim 7 wherein the delivery screw has an upper end projecting outside of the receptacle and connected to an electric drive mounted on the receptacle exterior, and whereby the delivery screw has a conveying direction extending from the bottom wall in the direction outside the receptacle.

9. The apparatus of claim 8 including at least two pairs of screw conveyors, one pair positioned along each base wall, and wherein the bottom of the receptacle forms a partition between the two pairs of screw conveyors, the partition including two inclined walls, each inclined wall extending from one of the base walls of the receptacle, the height of each inclined wall being less than the cross-sectional height of the corresponding screw conveyor.

10. The apparatus of claim 9 wherein at least one of the partition walls has at least one air inlet.

11. The apparatus of claim 1 wherein the screw conveyor has a length of 4.5 m and a core diameter of 60–80 mm, and whereby the screw conveyor has a core formed by a hollow shaft.

12. The apparatus of claim 1 wherein the screw conveyor has a conveying direction along 85% of its length and an opposing direction along 15% of its length.

* * * * *